US011953174B2

(12) United States Patent
Oku

(10) Patent No.: US 11,953,174 B2
(45) Date of Patent: Apr. 9, 2024

(54) VEHICLE LIGHT GUIDE AND VEHICLE LAMP

(71) Applicant: Ichikoh Industries, Ltd., Isehara (JP)

(72) Inventor: Hiroaki Oku, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/003,874

(22) PCT Filed: Jun. 25, 2021

(86) PCT No.: PCT/JP2021/024170
§ 371 (c)(1),
(2) Date: Dec. 29, 2022

(87) PCT Pub. No.: WO2022/004599
PCT Pub. Date: Jan. 6, 2022

(65) Prior Publication Data
US 2023/0175665 A1 Jun. 8, 2023

(30) Foreign Application Priority Data
Jun. 30, 2020 (JP) ................................. 2020-113207

(51) Int. Cl.
*F21S 43/237* (2018.01)
*F21S 43/14* (2018.01)
(52) U.S. Cl.
CPC ............. *F21S 43/237* (2018.01); *F21S 43/14* (2018.01)
(58) Field of Classification Search
CPC .......... F21S 43/14; F21S 43/237; F21S 43/30; F21S 43/31; F21S 43/40; G02B 6/0038;
(Continued)

(56) References Cited

U.S. PATENT DOCUMENTS

2008/0232127 A1* 9/2008 Futami ................. G02B 6/0038
362/511
2009/0225562 A1* 9/2009 Hirano ................... F21S 43/239
362/516
(Continued)

FOREIGN PATENT DOCUMENTS

EP 2 543 540 A1 1/2013
EP 2 669 721 A1 12/2013
(Continued)

OTHER PUBLICATIONS

International Search Report dated Aug. 24, 2021 in PCT/JP2021/024170, filed on June 25, 2021, 2 pages.
(Continued)

*Primary Examiner* — Thomas M Sember
(74) *Attorney, Agent, or Firm* — Oblon, McClelland, Maier & Neustadt, L.L.P.

(57) ABSTRACT

To radiate light with uniform color and illuminance in a longitudinal direction, this vehicle light guide is rod-shaped and is disposed at a front portion of a vehicle. The vehicle light guide includes a base portion having a curved portion curved rearward from a front toward a side of the vehicle and guiding light from a light source so as to be emitted from an emission face at a front side of the vehicle, a plurality of prism portions arrayed in a longitudinal direction along a back face of the base portion and that reflect light forward, and a diffusing portion positioned in at least the curved portion in the longitudinal direction of the base portion and provided in a strip form on a bottom face side of the prism portions, and that diffuses light.

10 Claims, 7 Drawing Sheets

(58) Field of Classification Search
CPC ... G02B 6/0061; B60Q 1/0035; B60Q 1/2607
See application file for complete search history.

(56) References Cited

U.S. PATENT DOCUMENTS

| | | | |
|---|---|---|---|
| 2010/0254152 A1* | 10/2010 | Taleb-Bendiab | F21S 43/245 |
| | | | 362/487 |
| 2018/0031204 A1 | 2/2018 | De Lamberterie et al. | |
| 2018/0112847 A1* | 4/2018 | Childress | F21S 43/247 |
| 2018/0372296 A1* | 12/2018 | Saito | F21S 43/27 |
| 2019/0389364 A1* | 12/2019 | Shah | F21S 43/315 |

FOREIGN PATENT DOCUMENTS

| | | |
|---|---|---|
| EP | 3 130 837 A1 | 2/2017 |
| JP | 2012-190762 A | 10/2012 |
| JP | 2014-7014 A | 1/2014 |
| JP | 2014-038733 A | 2/2014 |
| JP | 2016-46093 A | 4/2016 |
| JP | 2016-119219 A | 6/2016 |
| JP | 2017-139059 A | 8/2017 |
| JP | 2018-506153 A | 3/2018 |
| KR | 10-2020-0036334 A | 4/2020 |

OTHER PUBLICATIONS

Extended European Search Report dated Nov. 9, 2023, in European Patent Application No. 21833884.6, therein, 9 pages.

\* cited by examiner

REAR ↕ FRONT

RIGHT ⟷ LEFT   UP ⊙  DOWN ⊗

VEHICLE LIGHT GUIDE AND VEHICLE LAMP

TECHNICAL FIELD

The present invention relates to a vehicle light guide and a vehicle lamp.

BACKGROUND ART

A vehicle lamp equipped with a vehicle light guide that guides light from a light source so as to be emitted is known (see, for example, Patent Literature 1). In such a vehicle light guide, light emitted from a light source is incident from one end of the longitudinal direction of the vehicle light guide, and the incident light is guided along the longitudinal direction and emitted from a side face.

CITATION LIST

Patent Literature

Patent Literature 1: Japanese Patent Laid-open Publication No. 2014-7014

SUMMARY OF THE INVENTION

Problems to be Solved by the Invention

In the above mentioned vehicle light guide, light is required to be uniform in color and illumination in the longitudinal direction.

The present invention was made in view of the above, and an object of the invention is to provide a vehicle light guide and a vehicle lamp capable of emitting light which is uniform in color and illumination in the longitudinal direction.

Means for Solving the Problem

A vehicle light guide according to the present invention includes: a rod-shaped base portion disposed at a front portion of a vehicle in a state of being installed in the vehicle, the base portion having a curved portion curved rearward from a front face of the vehicle toward a side face at an outer side of the vehicle, and guides light from a light source so as to be emitted from an emission surface at a front side facing forward and sideway of the vehicle; a plurality of prism portions arranged along a longitudinal direction on a back face side with respect to the emission surface of the base portion and that reflect light toward the front side; and a diffusing part positioned in a range including at least the curved portion in the longitudinal direction of the base portion and provided in a strip form along the prism portions on a bottom face side of the prism portions, and that diffuses light.

Furthermore, the prism portions provided in the curved portion of the base portion have a smaller dimension in a height direction than those provided on the front face side of the base portion.

Furthermore, the diffusing part may have a uniform dimension in a width direction at least in a portion provided in the curved portion.

Furthermore, the diffusing part may have a shape whose end portion gradually tapers toward the front face side of the vehicle.

Furthermore, the diffusing part may be an embossed part formed on a surface of the base portion.

A vehicle lamp according to the present invention includes: a light source; and the vehicle light guide to guide light from the light source so as to be emitted in front of the vehicle.

Effect of the Invention

According to the present invention, it is possible to provide a vehicle light guide and a vehicle lamp that can emit light in uniform color and illumination in the longitudinal direction.

MODE FOR CARRYING OUT THE INVENTION

Hereinafter, embodiments of a vehicle light guide and a vehicle lamp according to the present invention will be described with reference to the drawings. This invention is not limited to the embodiment. In addition, components in the following embodiment include those that are substitutable and easy to be replaced by those skilled in the art, or those that are substantially identical. In the following description, each of the front-rear, up-down, and right-left directions is a direction in an in-vehicle state where a vehicle light guide and a vehicle lamp are installed in a vehicle, and indicates a direction when the traveling direction of the vehicle is viewed from the driver's seat. In this embodiment, the up-down direction is parallel to the vertical direction and the left-right direction is the horizontal direction. In addition, in this embodiment, the side facing the front and side of the vehicle is the front side, and the back side of the front side, viewed from the vertical direction, is the rear side.

Figure 1:
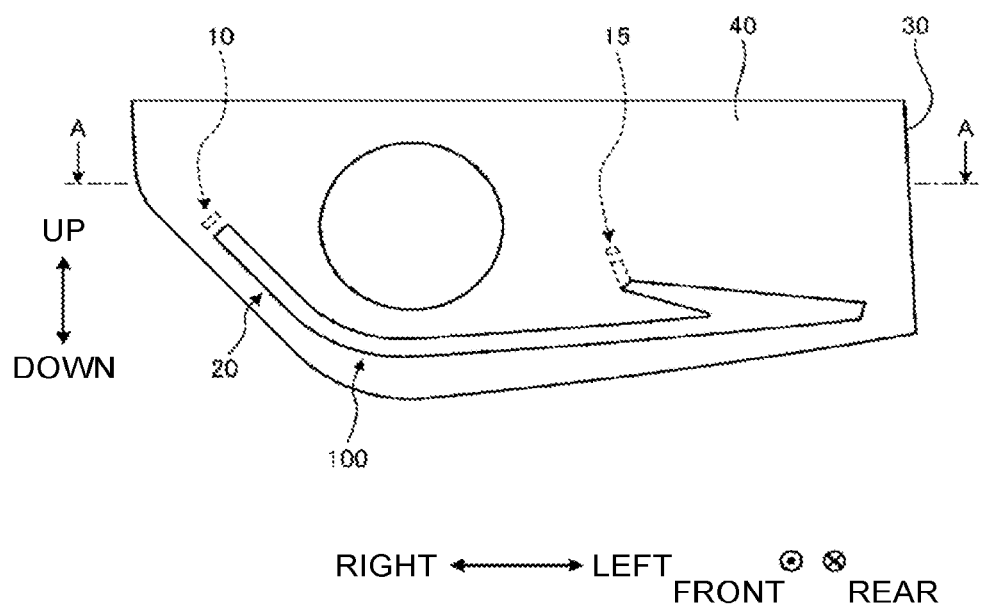
FIG. 1 is a front view showing one example of a vehicle lamp according to the present embodiment.
Figure 2:
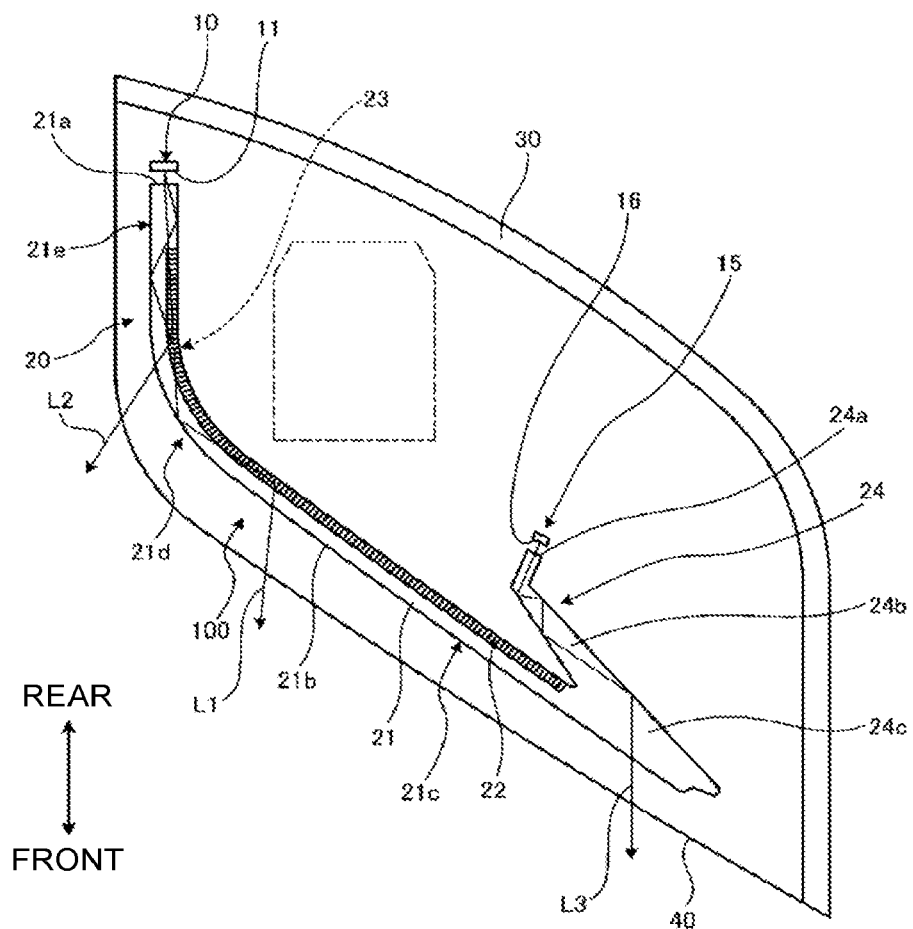
FIG. 2 is an A-A arrow cross-sectional view in FIG. 1, FIG. 3 schematically shows an example of a vehicle lamp as viewed from below.

FIG. 1 is a front view showing one example of a vehicle lamp 100 according to the present embodiment. FIG. 2 is an A-A arrow cross-sectional view in FIG. 1. As shown in FIGS. 1 and 2, the vehicle lamp 100 has light sources 10, 15 and a vehicle light guide 20. The vehicle lamp 100 includes, for example, a clearance lamp. The vehicle lamp 100 is located in a light chamber, which is divided by a lamp housing 30 and a lamp lens 40. In addition to the vehicle lamp 100, lamps for low beams, lamps for high beams, fog lamps, cornering lamps, etc. may be located in the light chamber, for example.

The vehicle lamp 100 is mounted on both the left and right sides of the front of the vehicle. The present embodiment is described below with an example in which the vehicle lamp is mounted on the right side of the front of a vehicle. The vehicle lamp mounted on the left side of the vehicle is configured to have a left-right symmetry with the vehicle lamp 100, so that a similar explanation can be applied. In the vehicle lamp 100 mounted on the right side of the vehicle, the outside of the vehicle is the right side and the inside of the vehicle is the left side. In the vehicle lamp mounted on the left side of the vehicle, the outside of the vehicle is the left side and the inside of the vehicle is the right side.

The light sources 10, 15 provide white light, for example, with the vehicle light guide 20. The light sources 10, 15 are a semiconductor type light source, such as an LED, for example. One or more light sources can be provided. In the present embodiment, two light sources 10, 15 are provided. One or more than three light sources may be provided. The light sources 10, 15 have light emitting surfaces 11, 16 that emit light, respectively. The light emitting surface 11 is disposed so as to face an incidence surface 21a of a base portion 21 of the vehicle light guide 20 described later. The light emitting surface 16 is disposed so as to face an incidence surface 24a of a merging portion 24 of the vehicle light guide 20 described later.

The vehicle light guide 20 has a base portion 21, prism portions 22, a scattering part 23, and a merging portion 24. The base portion 21 is rod-shaped and is located on the front side of the vehicle. The base portion 21 has a first straight portion 21c located on the front face side of the vehicle, a curved portion 21d that curves rearward from the front face side to the side face of the vehicle, and a second straight portion 21e located on the side face of the vehicle. The base portion 21 has the incidence surface 21a at the rear end of the first straight portion 21c. The incidence surface 21a receives light from the light source 10. In addition, the base portion 21 has an emission surface 21b on the front side throughout the first straight portion 21c, the curved portion 21d and a second straight portion 21e. The emission surface 21b emits the guided light to the front side.

The prism portions 22 are located on the back side of the base portion 21 with respect to the emission surface 21b. The prism portions 22 are arranged along a longitudinal direction of the base portion 21 and reflect light to the front side.

Figure 3:
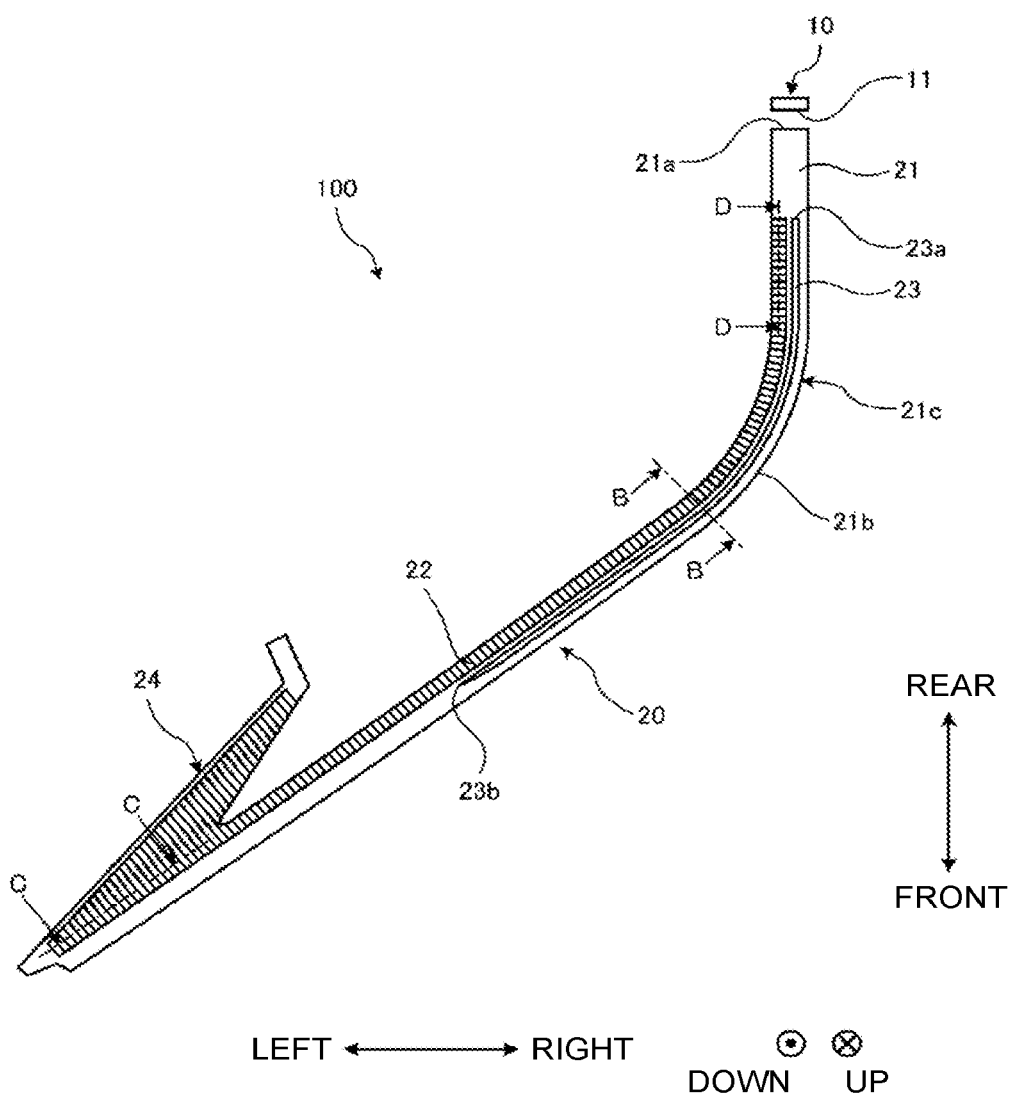
Figure 4:
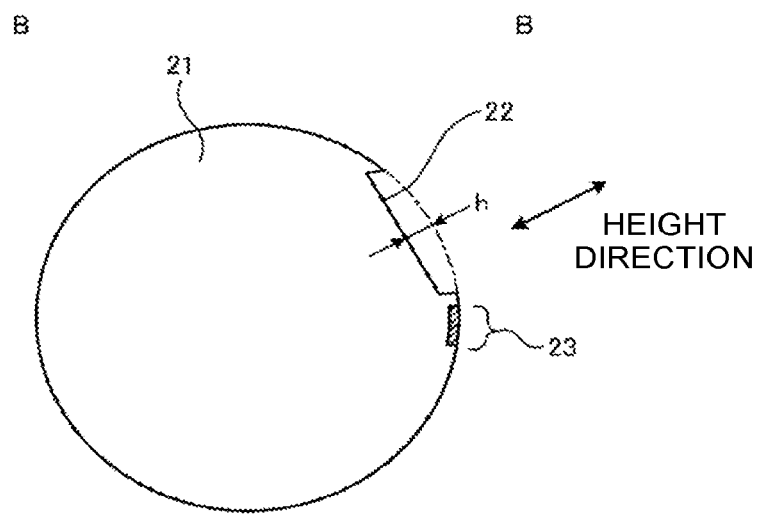
FIG. 4 is a B-B arrow cross-sectional view in FIG. 3.

FIG. 3 schematically shows an example of the vehicle lamp 100 viewed from below. FIG. 4 is a B-B arrow cross-sectional view in FIG. 3. As shown in FIG. 4, the prism portions 22 have a flat bottom. Hereafter, the direction orthogonal to the bottom of the prism portions 22 is denoted as a height direction of the prism portions 22.

Figure 5:
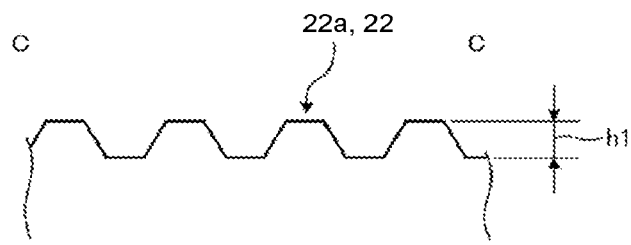
FIG. 5 is a C-C arrow cross-sectional view in FIG. 3.
Figure 6:
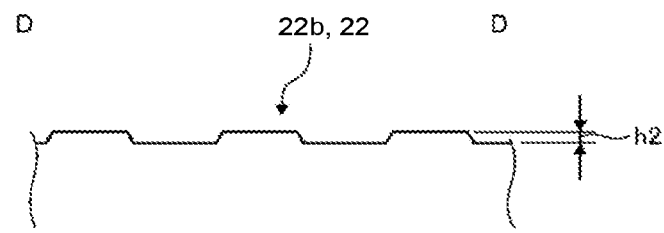
FIG. 6 is a D-D arrow cross-sectional view in FIG. 3.

FIG. 5 is a C-C arrow cross-sectional view in FIG. 3. FIG. 6 is a D-D arrow cross-sectional view in FIG. 3. As shown in FIGS. 5 and 6, the prism portions 22 provided in the curved portion 21d of the base portion 21 have a smaller dimension in the height direction thereof (hereinafter referred to as "height") than those provided on the front face side of the base portion 21. For example, the height h2 of the prism portions 22 at the end on the side face side (see FIG. 6) is smaller than one-tenth of the height h1 of the prism portions 22 at the end on the front face side (see FIG. 5). The height h2 of the prism portions 22 at the end on the side face side may be set to 0.1 mm or less, for example. The relationship between the height h1 and the height h2 is only an example and is not limited thereto. In this way, by the prism portions 22 being formed so that it gradually increases in height from the end on the side face side to the end on the front side, the area of the reflective surface at the portion far from the light source 10 can be larger than the area of the reflective surface at the portion close to the light source 10. Thus, the amount of light emitted from the emission surface 21b can be adjusted to be uniform in the longitudinal direction.

Figure 7:
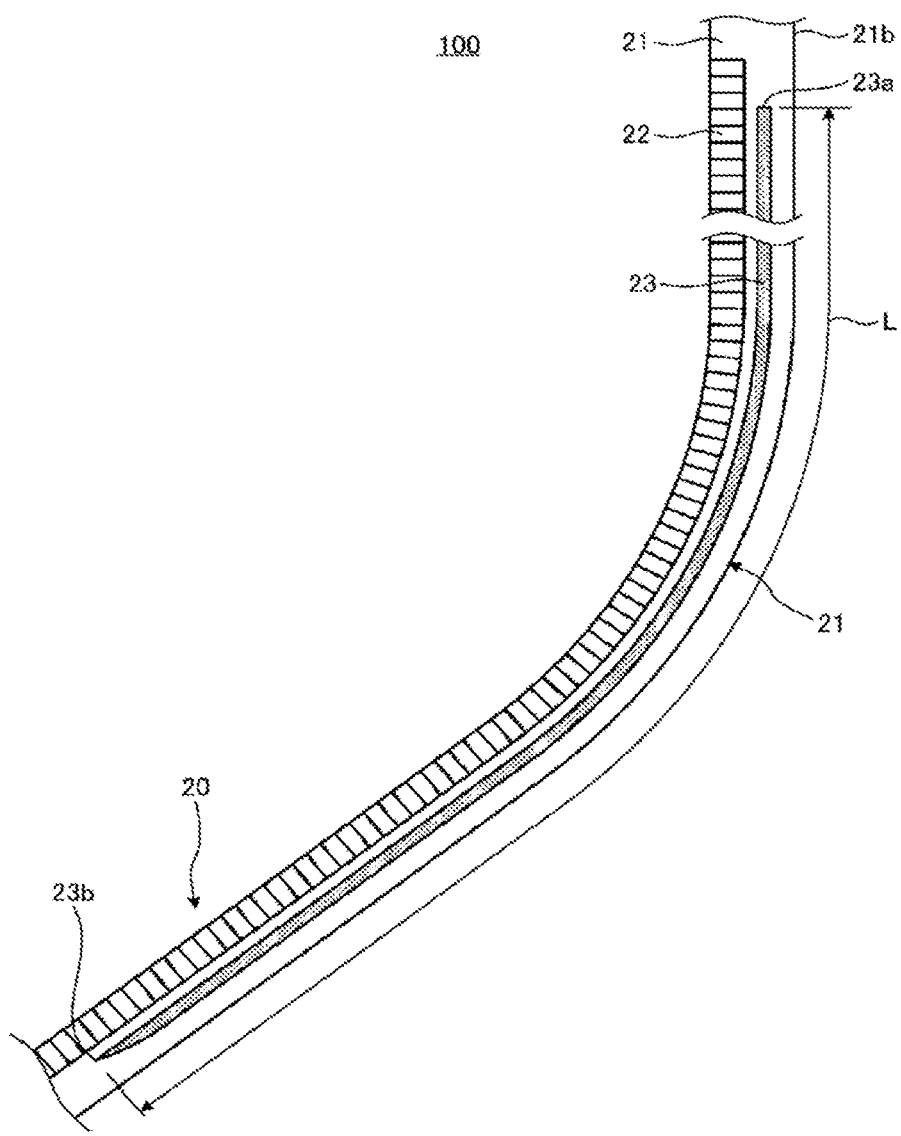
FIG. 7 is an enlarged diagram showing a main part of FIG. 3.

FIG. 7 is an enlarged view showing a main part of FIG. 3. As shown in FIGS. 3, 4, and 7, the scattering part 23 is provided in a strip along the prism portions 22. The scattering part 23 diffuses light traveling through the interior of the base portion 21 to the inner surface. By providing the scattering part 23, the scattering of light inside the vehicle light guide 20 can be increased. Therefore, even when bluish light is generated by Rayleigh scattering in the curved portion 21d of the vehicle light guide 20, for example, the bluish light can be mitigated by the light scattered by the scattering part 23. Thus, the vehicle light guide 20 can emit a uniform color light over the entire longitudinal direction of the base portion 21.

The scattering part 23 is provided in a range including at least the curved portion 21d in the longitudinal direction of the base portion 21. This allows the effect of the bluish light generated by Rayleigh scattering at the curved portion 21d to be effectively mitigated. For example, the longitudinal dimension L of the scattering part 23 is formed to be about one-half the longitudinal dimension of the base portion 21. In the present embodiment, the longitudinal dimension of the base portion 21 may be about 70 mm, and the longitudinal dimension L of the scattering part 23 may be about 32 mm, but they are not limited to these dimensions.

Furthermore, as shown in FIG. 7, in the present embodiment, the rear side end portion 23a of the scattering part 23 is placed forward of the rear side end portion of the prism portions 22, for example, but it is not limited thereto, and the rear side end portion 23a may be positioned rearward or at a position aligned in the front-back direction with the rear side end portion of the prism portions 22.

The scattering part 23 is located at the front lower part of the base portion 21 so that it is positioned at the front lower portion of the base portion 21, for example when viewed from diagonally above the front side of the vehicle (e.g., diagonally 45 degrees above). The scattering part 23 may be located in other positions. The scattering part 23 includes an embossed part formed by embossing the surface of the base portion 21, for example. This configuration allows scattering to be surely generated in the scattering part 23.

Figure 8:
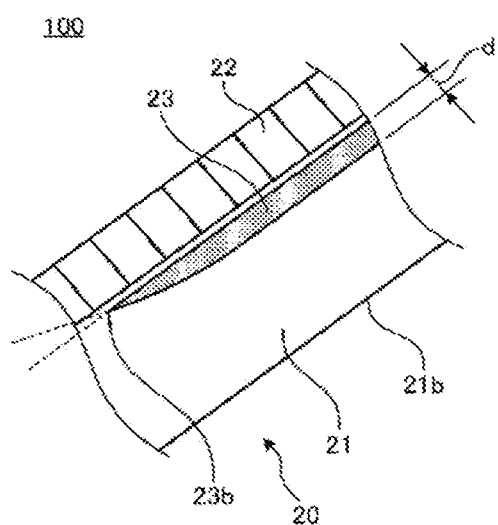
FIG. 8 is an enlarged diagram showing a main part of FIG. 7.

FIG. 8 is an enlarged view showing the main part of FIG. 7. As shown in FIG. 8, in the present embodiment, the scattering part 23 is formed so that a width dimension d is from 1 mm to 2 mm, inclusive, for example. The scattering part 23 is formed uniformly in the width dimension d from the end portion 23a on the side face side to the front face side, but it is not limited thereto, and the width dimension d may partially vary in the longitudinal direction. The scattering part 23 has a shape that gradually tapers at the front face side end portion 23b. This shape allows light scattered inside the base portion 21 to be reduced gradually toward the front side. This allows a sudden change in the state of light scattering to be suppressed between the area where the scattering part 23 is not provided and the area where the scattering part 23 is provided. The front face side end portion 23b of the scattering part 23 is located, for example, in the first straight portion 21c of the base portion 21, but it is not limited thereto, and the front face side end portion 23b may be placed in the curved portion 21d.

The merging portion 24 guides light from the light source 15 toward the forward end of the base portion 21. The merging portion 24 has an incidence surface 24a, a light guide portion 24b, and a connecting portion 24c. The incidence surface 24a receives light from the light source 15. The light guide portion 24b is, for example, plate-shaped and emits light in front of the vehicle while guiding the light incident from the incidence surface 24a. The connecting portion 24c supplies light guided by the light guide portion 24b to the base portion 21. The merging portion 24 may not be provided.

In the vehicle lamp 100 configured as described above, light emitted from the light source 10 enters from the incidence surface 21a to the base portion 21 and the merging portion 24 of the vehicle light guide 20.

Light L1, which is part of the light incident from the incidence surface 21a, is guided along the longitudinal direction while being internally reflected in the interior of the base portion 21. The light L1, for example, travels from the second straight portion 21e of the base portion 21, sneaking through the curved portion 21d, to the first straight portion 21c, and is reflected to the front side by the prism portions 22 of the first straight portion 21c. The light L1 reflected to the front side is emitted from the emission surface 21b to the front of the vehicle.

In addition, light L2, which is a part of the light incident from the incidence surface 21a, is guided along the longitudinal direction while being internally reflected in the interior of the base portion 21, and reflected to the front side by the prism portions 22 of the second straight portion 21e of the base portion 21, for example. The light L2 reflected to the front side is emitted from the emission surface 21b to the sideway of the vehicle.

Furthermore, light L3 emitted from the light source 15 enters from the incidence surface 24a to the merging portion 24. The light L3 incident on the merging portion 24 is guided by the light guide portion 24b, and the light is partially emitted in front of the vehicle from the light guide portion 24b. In addition, the light L3 is partially provided through the connecting portion 24c to the first straight portion 21c of the base portion 21. The light L3 supplied to the first straight portion 21c travels toward the front side and is emitted in front of the vehicle from the emission surface 21b.

According to the rod-shaped vehicle light guide 20 of the present embodiment, in the curved portion 21d of the base portion 21, for example, light from the light source 10 more sneaks and less scatters than other portions, so that the Rayleigh scattering phenomenon to bluely glow is likely to occur. This makes it difficult to achieve uniform color in the longitudinal direction of the vehicle light guide 20.

In contrast, the vehicle light guide 20 according to the present embodiment includes: a rod-shaped base portion 21 disposed at a front portion of a vehicle in a state of being installed in the vehicle, the base portion 21 having a curved portion 21d curved rearward from a front face side of the vehicle toward a side face of the vehicle, and guides light from a light source 10 so as to be emitted from an emission surface 21b at a front side facing forward and sideway of the vehicle; a plurality of prism portions 22 arranged along a longitudinal direction on a back face side with respect to the emission surface 21b of the base portion 21 and that reflect light toward the front side; and a scattering part 23 provided in a strip form along the prism portions 22 on a bottom face side of the prism portions 22 that are provided at least at the curved portion 21d of the base portion 21, and that diffuses light.

This configuration allows scattering of light to increase in the curved portion 21d of the base portion 21 by the scattering part 23. Therefore, even if the Rayleigh scattering phenomenon causes a blue glow in the curved portion 21d, the scattered light generated in the scattering part 23 can reduce the effect of blueness. Since the scattering part 23 is formed as a strip along the prism portions 22, scattered light can be generated while suppressing optical loss. This makes it possible to irradiate light with uniform color and illumination in the longitudinal direction.

In the vehicle light guide 20 of the present embodiment, the scattering part 23 may be located at a position where it is hidden by the base portion 21 when viewed from the front side of the vehicle.

In the vehicle light guide 20 of the present embodiment, the prism portions 22 provided in the curved portion 21d of the base portion 21 have a smaller dimension in a height direction than those provided on the front face side of the base portion 21. This configuration allows the effect of blueness to be reduced more effectively in the curved portion 21d where the amount of light reflected by the prism portions 22 is less.

In the vehicle light guide 20 of the present embodiment, the scattering part 23 is formed so as to gradually taper off to the end portion 23b on the front face side of the vehicle. This allows a sudden change in the light scattering state to be suppressed between the area where the scattering part 23 is not provided and the area where the scattering part 23 is provided.

In vehicle light guide 20 of the present embodiment, the scattering part 23 may be the embossed part formed on the surface of the base portion 21. This allows scattering to be surely generated in the scattering part 23.

The vehicle lamp 100 according to the present invention includes the light source 10 and the above described vehicle light guide to guide light from the light source 10 so as to be emitted in front of the vehicle. Thereby, as including the vehicle light guide 20 that can emit light of uniform color and illumination in the longitudinal direction, this makes it possible to provide the vehicle lamp 100 that looks excellent when lit.

The technical scope of the present invention is not limited to the above embodiments, and changes may be made as appropriate without departing from the gist of the present invention.

DESCRIPTION OF REFERENCE NUMERALS

L1, L2, L3 Light
10, 15 Light source
11, 16 Light emitting surface
20 Light guide
21 Base portion
21a, 24a Incidence surface
21b Emission surface
21c First straight portion
21d Curved portion
21e Second straight portion
22 Prism portion
23 Scattering part
23a, 23b End portion
24 merging portion
24b Light guide portion
24c Connecting portion
30 Lamp housing
40 Lamp lens
100 Vehicle lamp

The invention claimed is:
1. A vehicle light guide, comprising:
a rod-shaped base portion disposed at a front portion of a vehicle in a state of being installed in the vehicle, the base portion having a curved portion curved rearward from a front face of the vehicle toward a side face at an outer side of the vehicle, and guiding light from a light source to emit the light from an emission surface at a front side facing forward and sideways of the vehicle;

a plurality of prism portions arranged along a longitudinal direction on a back face side with respect to the emission surface of the base portion and reflecting the light toward the front side; and a diffusing part that is a part of an inner surface of the base portion and diffuses the light guided in the base portion, the part being positioned at a front lower portion of the base portion when viewed from diagonally above the front side of the vehicle, in a range including at least the curved portion in the longitudinal direction of the base portion to diffuse the light to the inner surface of the base portion and having a form of a strip extending along the prism portions.

2. The vehicle light guide according to claim 1, wherein the prism portions provided in the curved portion of the base portion have a smaller dimension in a height direction than those provided on the front face side of the base portion.

3. A vehicle lamp, comprising:
a light source; and
the vehicle light guide according to claim 2 that guides light from the light source so as to be emitted in front of the vehicle.

4. The vehicle light guide according to claim 1, wherein the diffusing part has a uniform dimension in a width direction at least in the curved portion.

5. A vehicle lamp, comprising:
a light source; and
the vehicle light guide according to claim 3 that guides light from the light source so as to be emitted in front of the vehicle.

6. The vehicle light guide according to claim 1, wherein the diffusing part has the form of the strip whose end portion gradually tapers toward the front face side of the vehicle.

7. A vehicle lamp, comprising:
a light source; and
the vehicle light guide according to claim 6 that guides light from the light source so as to be emitted in front of the vehicle.

8. The vehicle light guide according to claim 1, wherein the diffusing part is an embossed surface.

9. A vehicle lamp, comprising:
a light source; and
the vehicle light guide according to claim 8 that guides light from the light source so as to be emitted in front of the vehicle.

10. A vehicle lamp, comprising:
a light source; and
the vehicle light guide according to claim 1 that guides light from the light source so as to be emitted in front of the vehicle.

* * * * *